(12) United States Patent
Baumecker et al.

(10) Patent No.: US 10,089,120 B2
(45) Date of Patent: Oct. 2, 2018

(54) WIDGETS IN DIGITAL DASHBOARDS

(71) Applicant: Hewlett Packard Enterprise Development LP, Fort Collins, CO (US)

(72) Inventors: Klaus Baumecker, Boeblingen (DE); Andreas Weber, Boeblingen (DE); Falk Edelmann, Boeblingen (DE)

(73) Assignee: ENTIT SOFTWARE LLC, Sunnyvale, CA (US)

(*) Notice: Subject to any disclaimer, the term of this patent is extended or adjusted under 35 U.S.C. 154(b) by 432 days.

(21) Appl. No.: 14/865,505

(22) Filed: Sep. 25, 2015

(65) Prior Publication Data

US 2017/0090723 A1    Mar. 30, 2017

(51) Int. Cl.
*G06F 3/0484* (2013.01)
*G06F 3/0482* (2013.01)
*G06F 9/451* (2018.01)
*G06F 9/44* (2018.01)
*G06Q 10/06* (2012.01)

(52) U.S. Cl.
CPC ........... *G06F 9/451* (2018.02); *G06F 3/0484* (2013.01); *G06F 9/4443* (2013.01); *G06Q 10/063* (2013.01); *G06Q 10/0639* (2013.01); *G06F 2203/04804* (2013.01)

(58) Field of Classification Search
CPC .......................... G06F 3/04842; G06F 3/0482
USPC ........................................................ 715/762
See application file for complete search history.

(56) References Cited

U.S. PATENT DOCUMENTS

| | | | |
|---|---|---|---|
| 6,871,197 B1 * | 3/2005 | Johnson .............. | G06F 17/3089 706/12 |
| 7,516,158 B2 | 4/2009 | Drukman et al. | |
| 7,987,428 B2 * | 7/2011 | Handy .................... | G06F 3/048 707/754 |
| 8,020,089 B1 * | 9/2011 | Brichford ........... | G06F 17/2247 715/234 |
| 8,164,596 B1 * | 4/2012 | Bech ....................... | G06T 13/00 345/473 |
| 8,185,830 B2 * | 5/2012 | Saha ................... | G06F 17/3089 715/741 |
| 8,234,564 B2 * | 7/2012 | Drieu .................... | G06F 17/214 715/234 |
| 8,253,747 B2 * | 8/2012 | Niles ...................... | G06T 13/20 345/419 |
| 8,291,334 B1 * | 10/2012 | Castellanos .............. | G06F 8/38 715/769 |
| 8,423,883 B1 * | 4/2013 | Stockmann ............ | G09G 3/003 345/549 |

(Continued)

OTHER PUBLICATIONS

Elias and Bezerianos, Exploration Views: Understanding Dashboard Creation and Customization for Visualization Novices, (Interact 2011 Part IV), 2011, p. 291.

*Primary Examiner* — Daeho D Song (57) ABSTRACT

Dashboard data representing a digital dashboard generated by a dashboard editor may be received. The digital dashboard may include a data widget to display metric data related to a metric. The data widget may be associated with a data source to receive the metric data from the data source. In response to the dashboard data representing the digital dashboard being loaded by a dashboard viewer for display, the metric data may be sent from the data source to the dashboard viewer so that the dashboard viewer is to display the metric data in the data widget.

19 Claims, 3 Drawing Sheets

(56) References Cited

U.S. PATENT DOCUMENTS

| | | | |
|---|---|---|---|
| 8,478,722 B2* | 7/2013 | Lee | G06Q 10/10 707/622 |
| 8,869,027 B2 | 10/2014 | Louch et al. | |
| 8,881,038 B1* | 11/2014 | Palmer | G06T 11/60 715/764 |
| 8,990,258 B2 | 3/2015 | Bhatia | |
| 9,280,443 B2* | 3/2016 | Che | G06F 11/3612 |
| 9,317,489 B2* | 4/2016 | Antipa | G06F 17/214 |
| 9,483,164 B2* | 11/2016 | Louch | G06F 3/04817 |
| 9,678,955 B2* | 6/2017 | Yao | G06Q 30/0281 |
| 9,754,245 B1* | 9/2017 | Davison | G06Q 20/12 |
| 9,836,502 B2* | 12/2017 | Papale | G06F 17/30424 |
| 2006/0277469 A1* | 12/2006 | Chaudhri | G06F 3/04817 715/709 |
| 2007/0101297 A1* | 5/2007 | Forstall | G06F 3/04817 715/841 |
| 2008/0034314 A1* | 2/2008 | Louch | G06F 3/0481 715/778 |
| 2008/0104496 A1* | 5/2008 | Williams | G06Q 10/107 715/209 |
| 2008/0120324 A1* | 5/2008 | Davis | G06F 17/30035 |
| 2008/0195483 A1* | 8/2008 | Moore | G06F 17/3089 705/14.69 |
| 2008/0209078 A1* | 8/2008 | Bates | G06Q 10/00 710/10 |
| 2008/0307320 A1* | 12/2008 | Payne | G06F 3/0481 715/751 |
| 2009/0113310 A1* | 4/2009 | Appleyard | G06F 17/3089 715/742 |
| 2009/0164250 A1* | 6/2009 | Hamilton | G06Q 10/06393 705/3 |
| 2009/0172518 A1* | 7/2009 | Ogievetsky | G06F 17/30893 715/234 |
| 2009/0216634 A1* | 8/2009 | Peltonen | G06Q 30/02 705/14.14 |
| 2009/0235149 A1* | 9/2009 | Frohwein | G06F 9/451 715/205 |
| 2010/0037168 A1* | 2/2010 | Thayne | G06F 17/211 715/769 |
| 2010/0198649 A1* | 8/2010 | Appleyard | G06Q 10/0631 705/7.12 |
| 2011/0007212 A1* | 1/2011 | Lee | G06F 3/04817 348/468 |
| 2011/0126213 A1* | 5/2011 | Macken | G06F 9/4445 719/313 |
| 2011/0244845 A1* | 10/2011 | Park | H04M 1/72552 455/419 |
| 2012/0089902 A1* | 4/2012 | Sheflin | G06Q 10/06 715/234 |
| 2012/0144332 A1* | 6/2012 | Sola | G06F 17/30398 715/769 |
| 2012/0254799 A1* | 10/2012 | Nonez | G06F 3/0483 715/823 |
| 2013/0173402 A1* | 7/2013 | Young | G06Q 30/0635 705/14.73 |
| 2013/0205020 A1* | 8/2013 | Broda | G06F 11/3495 709/224 |
| 2013/0297338 A1* | 11/2013 | Urmann | G06Q 30/018 705/2 |
| 2014/0129969 A1* | 5/2014 | Chasman | G06F 3/0486 715/769 |
| 2014/0227675 A1* | 8/2014 | Budhu | G09B 7/02 434/362 |
| 2015/0007068 A1 | 1/2015 | Lilley et al. | |
| 2015/0153918 A1 | 6/2015 | Chen et al. | |
| 2016/0103592 A1* | 4/2016 | Prophete | G06F 3/04845 715/771 |
| 2016/0103872 A1* | 4/2016 | Prophete | G06F 17/30398 707/722 |
| 2017/0161354 A1* | 6/2017 | Cho | G06F 17/21 |

* cited by examiner

WIDGETS IN DIGITAL DASHBOARDS

BACKGROUND

A digital dashboard, as understood herein, is an electronic interface to display metric data relating to a metric. For example, the digital dashboard may simultaneously display different metric data relating to different metrics, for example different metrics associated with different aspects of an organization.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

In some examples, digital dashboards may display metric data relating to multiple metrics. For each of the metrics, the respective metric data may be received from a different source. Therefore, data from different sources may be simultaneously displayed on the same dashboard. In some examples, the digital dashboard may provide a real-time display with dynamically changing metric data related to the metrics.

In some examples, the digital dashboard may be customizable by a user such that digital dashboard may perform display different data relating to different metrics according to a user's selection. For example, the user may select the widgets to be used in the digital dashboard, and also select the data associated with each of the widgets. However, in some examples, the digital dashboard may not be both easily user-customizable using a dashboard editor and easily displayable using a wide variety of dashboard viewers. Additionally, in some examples, the process of generating and viewing the digital dashboard may be overly complex due to data format transformations of the digital dashboard.

Accordingly, the present disclosure provides examples in which a dashboard editor may generate a digital dashboard in a vector format such as the Scalable Vector Graphics (SVG) format, such that the digital dashboard may be viewable, for example, in the same vector format using a wide variety of dashboard viewers such as web browsers without, for example, involving intervening data format transformations. Thus, the original design of the digital dashboard (e.g. designs, sizes, and locations of widgets) as defined in the original vector format may be displayed in a dashboard viewer, without any changes except that dynamic data may be displayed in the data widgets rather than the static original design of the data widgets. Additionally, integration with data sources may occur after the design of the digital dashboard. A vector format is an image format that includes a geometric description of an image allowing the image to be rendered smoothly at any desired display size.

Figure 1:
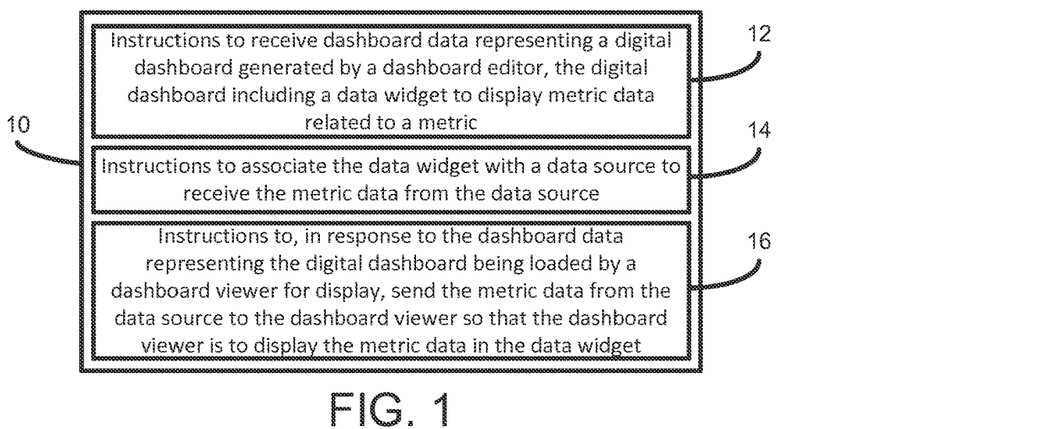
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 that, when executed by a processor, cause the processor to receive dashboard data representing a digital dashboard generated by a dashboard editor, the digital dashboard including a data widget to display metric data related to a metric. The non-transitory computer readable storage medium 10 may include instructions 14 that, when executed by a processor, cause the processor to associate the data widget with a data source to receive the metric data from the data source. The non-transitory computer readable storage medium 10 may include instructions 16 that, when executed by a processor, cause the processor to, in response to the dashboard data representing the digital dashboard being loaded by a dashboard viewer for display, send the metric data from the data source to the dashboard viewer so that the dashboard viewer is to display the metric data in the data widget.

Figure 2:
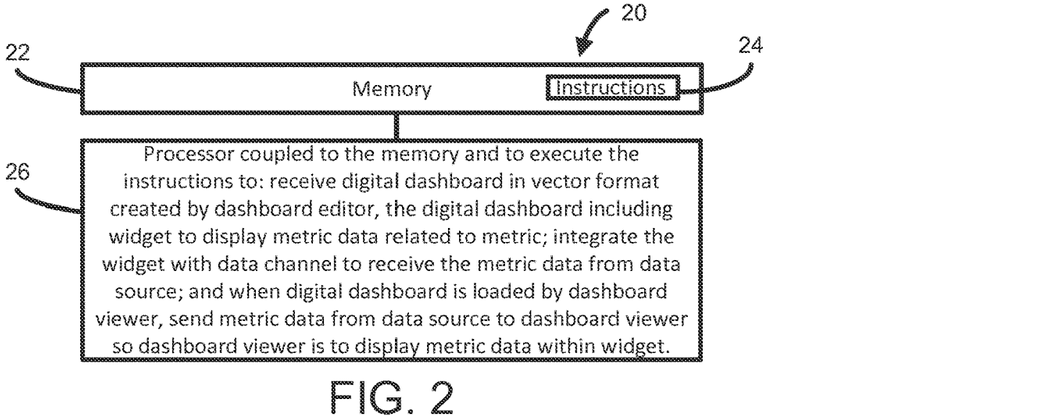
FIG. 2 is a block diagram illustrating a system according to some examples.

FIG. 2 is a block diagram illustrating a system 20 according to some examples. The system 20 may include a memory 22 comprising instructions 24. The system 20 may include a processor 26 coupled to the memory 22 and to execute the instructions 24 to: receive a digital dashboard in a vector format created by a dashboard editor, the digital dashboard including a widget to display metric data related to a metric; integrate the widget with a data channel to receive the metric data from a data source; and when the digital dashboard in the vector format is loaded by a dashboard viewer for display, send the metric data from the data source through the data channel to the dashboard viewer so that the dashboard viewer is to display the metric data within the widget.

Figure 3:
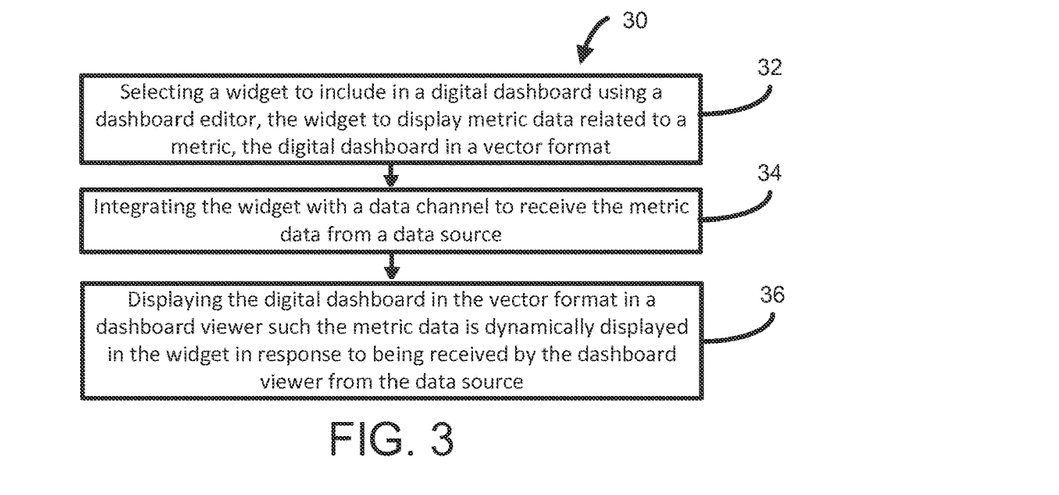
FIG. 3 is a flow diagram illustrating a method according to some examples.

FIG. 3 is a flow diagram illustrating a method 30 according to some examples. At 32, a widget may be selected to be included in a digital dashboard using a dashboard editor. The widget may display metric data related to a metric. The digital dashboard may be in a vector format. At 34, the widget may be integrated with a data channel to receive the metric data from a data source. At 36, the digital dashboard may be displayed in the vector format in a dashboard viewer such the metric data is dynamically displayed in the widget in response to being received by the dashboard viewer from the data source.

Figure 4:
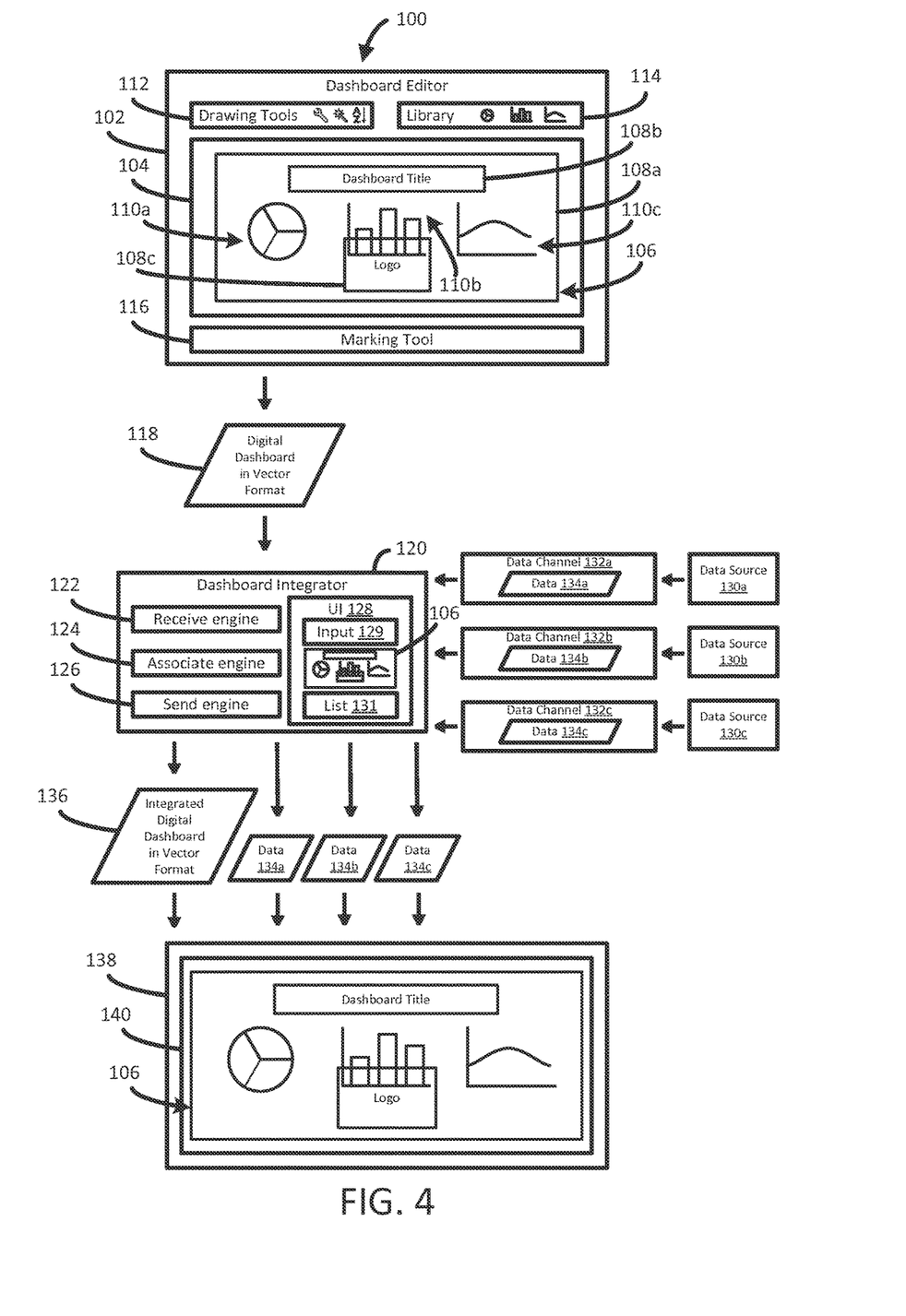
FIG. 4 is a schematic illustration of a system according to some examples.

FIG. 4 is a schematic illustration of a system 100 according to some examples. The system 100 includes a dashboard editor 102. In some examples, the dashboard editor 102 may be implemented within a computing system including a processor, non-transitory computer readable medium, and instructions such as software and/or firmware stored in the non-transitory computer-readable storage medium that, when executed by the processor, cause the processor to perform processes defined herein. Thus, the dashboard editor 102 may be implemented as instructions on a non-transitory computer readable medium. In some examples, the dashboard editor 102 may include hardware features to perform processes described herein, such as a logical circuit, application specific integrated circuit, etc. The dashboard editor 102 may, for example, be any suitable application for generating a digital dashboard in a vector format. Such vector formats may include, for example, the Scalable Vector Graphics (SVG) format. In other examples, other suitable vector formats may be used. In some examples, the dashboard editor 102 may be a graphics editing application, slideshow editing application, or the like. For example, the dashboard editor 102 may be Microsoft Visio, Inkscape, or Adobe Illustrator. However, other dashboard editors may be used.

The dashboard editor 102 may include a canvas 104 for generating (e.g. drawing) a digital dashboard. As shown, an example digital dashboard 106 is already generated in FIG. 2. In some examples, the dashboard editor 102 may include drawing tools 112 for a user to draw widgets 108a-c and 110a-c in the digital dashboard 106. In some examples, the dashboard editor 102 may include a library 114 which may include user-selectable, pre-drawn widgets 108a-c and 110a-c to be generated in the digital dashboard 102. The library 114 may, for example, be implemented as the Stencil tool in Microsoft Visio. In some examples, the widgets 108a-c and 110a-c may be selected from the library 114 and then further edited using the drawing tools 112 to finalize the widgets 108a-c and 110a-c.

In the example of FIG. 4, the widgets 108a-c are static widgets, shown as a border 108a, a dashboard title 108b, and a logo 108c. The static widgets 108a-c may be design or ornamental elements, or may be to provide information or data that is not to be dynamically updated when the digital dashboard 106 is displayed in a dashboard viewer. In some examples, a greater or lesser number of static widgets, or no static widgets, may be generated in the digital dashboard 106. Additionally, any other static widget may be generated on the digital dashboard 106 rather than the static widgets 108a-c shown. For example, static widgets may include any suitable type of geometric shape or image. The static widgets 108a-c may be static (e.g. unchanging) when generated in the canvas 106 using the drawing tools 112 and/or library 114. Additionally, the static widgets 108a-c may remain static when loaded in a dashboard viewer, as will be discussed. This may, for example, be due to not associating the static widgets 108a-c with respective markers indicating that the elements 108a-c are to be dynamic (e.g. changing), or by associating the static widgets 108a-c with markers indicating that the elements 108a-c are to be static.

Each of the widgets 110a-c may be for displaying respective metric data related to a respective metric. In the example of FIG. 4, the data widgets 110a-c are shown as a pie chart 110a, a bar graph 110b, and line chart 110c. In some examples, a greater or lesser number of widgets may be generated in the digital dashboard 106. Additionally, any other widgets may be generated on the digital dashboard 106 rather than the data widgets 110a-c shown. For example, widgets may include any suitable type of geometric shape or image, including text, numbers, gauges, dials, indicators, charts, graphs, or the like, for displaying metric data related to a metric.

In some examples, the metrics may comprise performance (e.g. performance of IT components or an organization), traffic (e.g. in a network), correlations between any data points, predictions of any data points, results on data mining, prices, costs, revenue, sales, online status of users, or the like. The metrics may, for example, be associated with an organization or multiple organizations, such as corporations, governments, non-profit institutions, or other organizations. However, other metrics may be used as well.

The data widgets 110a-c may be static when generated in the canvas 106 using the drawing tools 112 and/or library 114. However, using the dashboard integrator 120 as will be discussed, the data widgets 110a-c may be modified to become dynamic widgets when loaded in a dashboard viewer, or may be replaced with dynamic widgets when loaded in a dashboard viewer, as will be discussed. This may, for example, be due to associating the data widgets 110a-c with respective markers indicating that the data widgets 110a-c are to be dynamic (e.g. changing).

As discussed above, the static widgets 108a-c may be associated with respective markers indicating that the elements 108a-c are to be static when displayed by the dashboard viewer, and the data widgets 110a-c may be associated with respective markers indicating that the widgets 110a-c are to be dynamic. The association may be performed by a user using a marking tool 116. A user may use the marking tool 116 to select a marker or create a marker to be associated with each widget or static widget. In some examples, the marking tool 116 may be a pre-populated field associated with a pre-drawn static widget or widget in the library 114, such that a user may not need to separately associate a market with a static widget or widget. An example marking tool may, for example, be part of the Stencil tool in Microsoft Visio.

In some examples, any of the data widgets 110a-c or static widgets 108a-c may be partially transparent, and may therefore be overlap (e.g. be superimposed on) each other. For example, a data widget may overlap another data widget, a static widget may overlap another static widget, or a static widget may overlap another data widget. One or both of the overlapping widgets may be partially transparent. In FIG. 4, data widget 110b overlaps static widget 108c.

In some examples, once the digital dashboard 106 is generated with the widgets 108a-c and 110a-c, the digital dashboard may be saved as dashboard data 118 which may be in a vector format such as the SVG format or another suitable vector format.

As shown in FIG. 4, system 100 includes a dashboard integrator 120. The dashboard integrator 120 includes a receive engine 122, associate engine 124, and send engine 126. In some examples, the engines, and any computing components of the dashboard integrator 120, may be implemented as a computing system including a processor, non-transitory computer readable medium, and instructions such as software and/or firmware stored in the non-transitory computer-readable storage medium that, when executed by the processor, cause the processor to perform processes defined herein. In some examples, the engines may include hardware features to perform processes described herein, such as a logical circuit, application specific integrated circuit, etc. In some examples, multiple engines may be implemented using the same computing system features or hardware.

In some examples, the receive engine 122 may be to receive dashboard data 118 representing the digital dashboard 106 in a vector format from the dashboard editor 102. The digital dashboard 106 may include data widget 110a to display metric data 134a related to a first metric, data widget 110b to display metric data 134b related to a second metric, and data widget 110c to display metric data 134c related to a third metric.

In some examples, the associate engine 124 may be to associate (e.g. integrate) the data widgets 110a-c with respective data channels 132a-c to receive the respective metric data 134a-c from respective data sources 130a-c. That is, the data widget 110a may be associated with data channel 132a to receive the metric data 134a from data source 130a, the data widget 110b may be associated with data channel 132b to receive the metric data 134b from data source 130b, and the data widget 110c may be associated with data channel 132c to receive the metric data 134c from data source 130c. Thus, the digital dashboard 106 may be integrated with the data channels 132a-c and data sources 130a-c.

The data sources 130a-c may be communicatively coupled to the dashboard integrator 120. The data sources 130a-c may be any suitable types of data sources. The data sources may be associated with an organization, and/or may be distributed across a network at different nodes of the network. The data sources 130a-c may be any types of storage devices, sensors performing measurements and providing data, status reporting devices, or the like. The data channels 132a-c may, for example, be virtual constructs in which respective metric data 134a-c are sent from the respective data sources 130a-b to the dashboard integrator 120.

In some examples, the metric data 134a-c may include respective data values (e.g. a numerical value or a string value such as a status) related to the respective metrics. In some examples, the metric data 134a-c may be in the form of data packets comprising the respective data values (e.g. numerical or string value), names of the respective metrics (e.g. "CPU load time"), respective attributes of the metrics (e.g. a name of a data source providing the metric data), and/or colors to be used for displaying the numerical values as text or other graphical elements. The metric data 134a-c may, for example, be in a JavaScript Object Notation (JSON) format.

In some examples, the integration of the digital dashboard 106 with the data channels 132a-c and data sources 130a-c may be performed by a user. For example, the dashboard integrator 120 may include a user interface 128 which a user may view the digital dashboard 106 and a list 131 of available data sources 130a-c. A storage device coupled with the dashboard editor 120 may include metadata (e.g. a Uniform Resource Locator (URL) or other identifying data) for respective data sources 130a-c in the list so that the data sources 130a-c can be accessed. In some examples, a user may then input, into an input field 129, a selection of a data source 130a-c from the list 131 in the user interface 128 to be associated (e.g. integrated) with any respective data widgets 110a-c, which the associate engine 124 may determine are associated with a respective marker indicating that the respective data widget 110a-c is to be dynamic (e.g. changing). Thus, the association with data sources 130a-c may occur for the data widgets 110a-c but not for static widgets 108a-c, which the associate engine 124 may determine are associated with respective markers indicating that the respective static widgets 108a-c are not to be dynamic (e.g. are to be static), or which the associate engine 124 may determine are not associated with respective markers with respective markers indicating that the respective static widgets 108a-c are to be dynamic.

In some examples, rather than selecting data sources from the list 131, the user may add data sources to the list 131, and input, into the input field 129, a selection in the user interface 128 of a data source to be associated (e.g. integrated) with any respective data widgets 110a-c. In these examples, the user may input, into the input field 129, respective metadata (e.g. a Uniform Resource Locator (URL) or other identifying data) for respective data sources to be associated (e.g. integrated).

In some examples, once the data widgets 110a-c are associated (e.g. integrated) with the respective data channels 132a-c, the digital dashboard 106 after integration may be saved as integrated dashboard data 136 which may be in the vector format such as the SVG format or another suitable vector format. The integrated dashboard data 136 may, for example, comprise the dashboard data 118 after integration. For example, the integrated dashboard data 136 may include the metadata (e.g. URLs) associated with each of the data widgets 110a-c such that the data widgets 110a-c are associated with respective data sources 130a-c. The integrated dashboard data 136 may be loaded by a dashboard viewer 138 for display of the digital dashboard 106. The dashboard viewer 138 may include a viewing area 140 for viewing the digital dashboard 106. The metadata may further include an identifier indicating that the digital dashboard 106 is to access the send engine 126 of the dashboard integrator 120 such that the send engine 126 may access the data sources 130a-c using the URLs.

In some examples, the dashboard viewer 138 may be implemented within a computing system including a processor, non-transitory computer readable medium, and instructions such as software and/or firmware stored in the non-transitory computer-readable storage medium that, when executed by the processor, cause the processor to perform processes defined herein. Thus, the dashboard viewer 138 may be implemented as instructions on a non-transitory computer readable medium. In some examples, the dashboard viewer 138 may include hardware features to perform processes described herein, such as a logical circuit, application specific integrated circuit, etc. The dashboard viewer 138 may, for example, be any suitable application for viewing a digital dashboard in a vector format, such as a web browser.

In some examples, in response to the integrated dashboard data 136 representing the digital dashboard 106 in the vector format after integration being loaded by the dashboard viewer 138 to display the digital dashboard 106 in the viewing area 140, the send engine 126 may be to send the metric data 134a-c from the data sources 130a-c to the dashboard viewer 138 (as shown in FIG. 4) so that the dashboard viewer 138 is to display the metric data 130a-c in the respective data widgets 110a-c (e.g. the metric data 130a in the data widget 110a, the metric data 130b in the data widget 110b, and the metric data 130c in the data widget 110c). In some examples, the metric data 134a-c may be pushed to the dashboard viewer 138. In some examples, in response to the data 136 being loaded by the dashboard viewer 138, the static widgets 108a-c may be displayed statically (e.g. unchangingly) in the viewing area 140 in the digital dashboard 106.

In some examples, when the dashboard viewer 138 is displaying the data widgets 110a-c, the dashboard viewer 138 may, based on the integrated dashboard data 136 including the identifier indicating that the digital dashboard 106 is to access the send engine 126, notify the send engine 126 of the dashboard integrator 120 to send the metric data 134a-c from the data sources 130a-c using the URLs. Thus, the send engine 126 may access the metric data 134a-c through the data channels 132a-c from the data sources 130a-c, and send the metric data 134a-c to the dashboard viewer 138 for a real-time display in the data widgets 110a-c with up-to-date metric data 134a-c, as shown in FIG. 4. In some examples, based on the real-time access of the metric data 134a-c from the data sources 130a-c, the data 134a-c may be periodically (e.g. continuously) updated in the display. The period may, for example, be a regular period (e.g. same amount of time between each time the metric data is sent) or an irregular period (e.g., not the same amount of time between each time the metric data is sent). In some examples, based on the real-time access of the metric data 134a-c from the data sources 130a-c, the metric data 134a-c may be updated in the display when the dashboard is loaded or refreshed in the display, but may not be periodically updated in the display after the dashboard is loaded or refreshed.

In some examples, displaying the metric data 134a-c dynamically in the data widgets 110a-c may comprise hiding the static versions of the data widgets 110a-c and displaying dynamic versions of the data widgets 110a-c provided by the dashboard integrator 120. In these examples, the dynamic versions may be dynamic versions of that widgets that are stored in a storage device coupled to the dashboard integrator 120. In some examples, displaying the metric data 134a-c dynamically in the data widgets 110a-c may comprise modifying the appearance of the existing static versions of the data widgets 110a-c such that they become dynamic (e.g. by changing the elements, such as text, chart elements, or graph elements, responsible for data display, but not changing elements, such as design, labels, or shape, that are not responsible for data display).

In some examples, the send engine 126 may specify that the metric data 134a-c may be displayed in the data widgets 110a-c in respective data ranges suitable for the viewing the metric data 134a-c. For example, if metric data comprises numerical time values within a two week range, then the displayed data range may be a two week range. However, if a new update of metric data comprises additional values outside the two week range, then the displayed data range provided by the send engine 126 may be expanded to encompass a one month range, for example.

In some examples, after display in the dashboard viewer 138, the digital dashboard 106 may be edited further to add or remove any static widgets and data widgets using the dashboard editor 102, and subsequently integrated using the dashboard integrator 120 with different data sources. Thus, a modified version of the digital dashboard 120 may be displayed in the dashboard viewer 138. In this way, users may repeatedly modify, customize, and change the appearance of the digital dashboard 120 for future usage.

Figure 5:
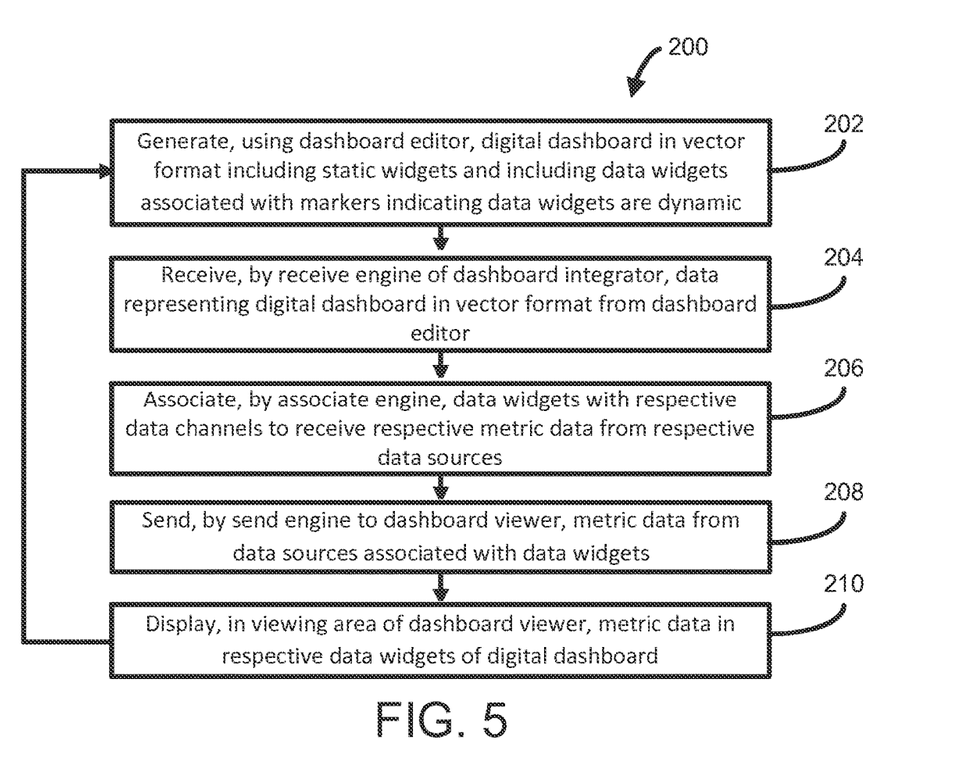
FIG. 5 is a flow diagram illustrating a method according to some examples.

FIG. 5 is a flow diagram illustrating a method 200 according to some examples. In some examples, the orderings shown may be varied, some elements may occur simultaneously, some elements may be added, and some elements may be omitted. In describing FIG. 5, reference will be made to elements described in FIG. 4. Any of the elements described earlier relative to FIG. 4 may be implemented in the process shown in and described relative to FIG. 5.

At 202, the digital dashboard 106 may be generated in a vector format using the dashboard editor 102. The digital dashboard 106 may include static widgets 108a-c, and may include data widgets 110a-c associated with respective markers indicating that the data widgets 110a-c are dynamic. At 204, dashboard data 118 representing the digital dashboard 106 in vector format from dashboard editor 102 may be received by the receive engine 122 of the dashboard integrator 120. At 206, the associate engine 122 of the dashboard integrator 120 may associate the data widgets 110a-c with respective data channels 132a-c to receive respective metric data 134a-c from respective data sources 130a-c. At 208, the send engine 124 of the dashboard integrator 120 may send metric data 134a-c from the data sources 130a-c associated with data widgets 110a-c to the dashboard viewer 138. At 210, the metric data 134a-c may be displayed in the viewing area 140 of the dashboard viewer 138 in respective data widgets 110a-c of the digital dashboard 106. As shown, the method may then return to 202 if the user chooses to further edit the digital dashboard 106 to add or remove any static widgets and data widgets, and continue through the subsequent elements of the method 200.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions that when executed by a processor, cause the processor to:
   receive dashboard data in a vector format representing a digital dashboard generated by a dashboard editor, the digital dashboard including a first data widget, and a second data widget to display metric data related to a metric, the first data widget associated with a first marker selected in the dashboard editor, and the second data widget associated with a second marker selected in the dashboard editor, the first marker indicating that the first data widget is to be displayed as a static data widget, and the second marker indicating that the second data widget is to be displayed as a dynamic data widget;
   responsive to the second marker selected to be associated with the second data widget in the dashboard data, integrate the second data widget with a data channel to receive the metric data from a data source, wherein the second data widget is associated with the data source based on user selection using a dashboard integrator after associating the dashboard data with the first and second markers, the dashboard integrator communicatively coupled to the data channel and the data source; and
   in response to the dashboard data in the vector format representing the digital dashboard being loaded by a dashboard viewer for display, send the metric data from the data source through the data channel to the dashboard viewer so that the dashboard viewer is to dynamically display the metric data in the second data widget.

2. The non-transitory computer-readable storage medium of claim 1, wherein the vector format comprises a Scalable Vector Graphics (SVG) format.

3. The non-transitory computer-readable storage medium of claim 1, wherein the dashboard viewer comprises a web browser.

4. The non-transitory computer-readable storage medium of claim 1, wherein the dashboard editor comprises Microsoft Visio, Inkscape, or Adobe Illustrator.

5. The non-transitory computer-readable storage medium of claim 1, wherein the first data widget is to be statically displayed by the dashboard viewer responsive to the first marker.

6. The non-transitory computer-readable storage medium of claim 1, further comprising another widget, wherein the second data widget overlaps the other widget, wherein the second data widget or the other widget is at least partially transparent.

7. The non-transitory computer-readable storage medium of claim 1, wherein the digital dashboard includes another data widget to display other metric data related to another metric that is different from the metric, and further comprising instructions that when executed, cause the processor to:
 associate the other data widget with another data source to receive the other metric data from the other data source; and
 in response to the dashboard data representing the digital dashboard being loaded by the dashboard viewer for display, send the other metric data from the other data source to the dashboard viewer so that the dashboard viewer is to display the other metric data in the other data widget.

8. The non-transitory computer-readable storage medium of claim 1, further comprising instructions that when executed, cause the processor to, in response to the dashboard data representing the digital dashboard being loaded by the dashboard viewer for display, cause the second data widget generated by the dashboard editor to be hidden and replaced with a dynamic data widget that displays the metric data.

9. The non-transitory computer-readable storage medium of claim 1, wherein, in response to the dashboard data representing the digital dashboard being loaded by the dashboard viewer for display, the metric data is to be periodically sent from the data source to the dashboard viewer so that the dashboard viewer is to display the metric data in the second data widget such that the metric data displayed changes each time the metric data is sent.

10. The non-transitory computer-readable storage medium of claim 1, further comprising instructions that when executed, cause the processor to receive a selection, by a user, of the data source from a list of available data sources to associate the second data widget with the data source.

11. The non-transitory computer-readable storage medium of claim 1, wherein the second data widget comprises a chart or graph in which the metric data is to be displayed.

12. A system comprising:
 a memory comprising instructions; and
 a processor coupled to the memory and to execute the instructions to:
  receive a digital dashboard in a vector format created by a dashboard editor, the digital dashboard including a first widget, and a second widget to display metric data related to a metric, the first widget associated with a first marker selected in the dashboard editor, and the second widget associated with a second marker selected in the dashboard editor, the first marker indicating that the first widget is to be displayed as a static widget, and the second marker indicating that the second widget is to be displayed as a dynamic widget;
  responsive to the second marker selected to be associated with the second widget, integrate the second widget with a data channel to receive the metric data from a data source, wherein the second widget is integrated with the data channel based on user selection using a dashboard integrator after associating the digital dashboard with the first and second markers, the dashboard integrator communicatively coupled to the data channel and the data source; and
  when the digital dashboard in the vector format is loaded by a dashboard viewer for display, send the metric data from the data source through the data channel to the dashboard viewer so that the dashboard viewer is to dynamically display the metric data within the second widget.

13. The system of claim 12, wherein the vector format comprises a Scalable Vector Graphics (SVG) format.

14. The system of claim 12, further comprising the dashboard editor executable on the processor to:
 present a canvas in a display;
 add the first widget and the second widget to the canvas using a drawing tool of the dashboard editor; and
 associate the first marker with the first widget and associate the second marker with the second widget using a marking tool of the dashboard editor.

15. A method executed by a system comprising a processor, comprising:
 selecting a first widget and a second widget to include in a digital dashboard using a dashboard editor, the second widget to display metric data related to a metric, the digital dashboard in a vector format;
 using the dashboard editor, associating the first widget with a first marker, and associating the second widget with a second marker, the first marker indicating that the first widget is to be displayed as a static widget, and the second marker indicating that the second widget is to be displayed as a dynamic widget;
 responsive to the second marker selected to be associated with the second widget, integrating the second widget with a data channel to receive the metric data from a data source, wherein the second widget is integrated with the data channel based on user selection using a dashboard integrator after the associating of the first widget with the first marker and the second widget with the second marker using the dashboard editor, the dashboard integrator communicatively coupled to the data channel and the data source; and
 displaying the digital dashboard in the vector format in a dashboard viewer such the metric data is dynamically displayed in the second widget in response to being received by the dashboard viewer from the data source.

16. The method of claim 15, further comprising selecting the first widget and the second widget from a widget library in the dashboard editor.

17. The method of claim 15, further comprising drawing the first widget and the second widget using the dashboard editor.

18. The method of claim 15, further comprising:

after displaying the digital dashboard in the vector format in the dashboard viewer, editing the digital dashboard using the dashboard editor to add another widget, wherein the other widget is to display other metric data related to another metric;

integrating the other widget with another data channel to receive the other metric data from another data source; and displaying the digital dashboard in the vector format in the dashboard viewer such the other metric data is dynamically displayed in the other widget in response to being received by the dashboard viewer from the other data source.

19. The method of claim 15, further comprising:

loading the digital dashboard in the vector format by the dashboard viewer for display; and receiving, by the dashboard viewer, the metric data from the data source through the data channel to the dashboard viewer so that the dashboard viewer dynamically displays the metric data in the widget.

\* \* \* \* \*